(12) United States Patent
Hasler et al.

(10) Patent No.: US 10,470,277 B2
(45) Date of Patent: Nov. 5, 2019

(54) HIGH EFFICIENCY LIGHT COMPATIBILITY DEVICE

(71) Applicant: Gregory S. Hasler, Pekin, IL (US)

(72) Inventors: Gregory S. Hasler, Pekin, IL (US); Timothy T. Tutt, Mattoon, IL (US)

(73) Assignee: Gregory S. Hasler, Pekin, IL (US)

( * ) Notice: Subject to any disclaimer, the term of this patent is extended or adjusted under 35 U.S.C. 154(b) by 0 days.

(21) Appl. No.: 16/383,630

(22) Filed: Apr. 14, 2019

(65) Prior Publication Data

US 2019/0239318 A1 Aug. 1, 2019

Related U.S. Application Data

(63) Continuation of application No. 15/646,000, filed on Jul. 10, 2017, which is a continuation-in-part of application No. 15/080,558, filed on Mar. 24, 2016, now Pat. No. 9,706,625, which is a continuation-in-part of application No. 13/683,665, filed on Nov. 21, 2012, now Pat. No. 9,301,368.

(Continued)

(51) Int. Cl.
| | |
|---|---|
| H05B 33/00 | (2006.01) |
| H05B 37/02 | (2006.01) |
| H05B 33/08 | (2006.01) |
| H05B 37/03 | (2006.01) |
| H01H 9/54 | (2006.01) |
| H05B 41/39 | (2006.01) |
| F21Y 115/10 | (2016.01) |
| F21V 19/00 | (2006.01) |

(52) U.S. Cl.
CPC ........... *H05B 37/0227* (2013.01); *H01H 9/54* (2013.01); *H05B 33/0845* (2013.01); *H05B 33/0887* (2013.01); *H05B 37/0272* (2013.01); *H05B 37/03* (2013.01); *H05B 41/39* (2013.01); *F21V 19/006* (2013.01); *F21Y 2115/10* (2016.08); *Y02B 20/19* (2013.01)

(58) Field of Classification Search
CPC ............ H05B 41/3924; H05B 37/0218; H05B 41/3927; H05B 37/02; H05B 37/0227; H05B 37/0281; H05B 41/382; H05B 37/0263; H05B 37/04; H05B 39/00; H05B 39/08; H05B 41/2851; H05B 41/2855; H05B 41/2858

See application file for complete search history.

(56) References Cited

U.S. PATENT DOCUMENTS

| | | | |
|---|---|---|---|
| 2006/0022611 A1* | 2/2006 | Rodriguez | H05B 39/00 315/245 |
| 2011/0285310 A1* | 11/2011 | Leinen | H05B 37/02 315/291 |
| 2013/0106303 A1* | 5/2013 | Yen | H05B 33/0815 315/206 |

* cited by examiner

*Primary Examiner* — Monica C King (74) *Attorney, Agent, or Firm* — Chicago IP Law; Steven M. Evans (57) ABSTRACT

An anti-flicker and anti-glow switchable load apparatus to be installed in the light socket of a commonly powered electronic switching device, such as a motion activated light switch. An energy efficient light bulb or lamp, such as a cathode fluorescent lamp or light emitting diode is then electrically connected to the apparatus. A first embodiment of the present invention includes a switchable light source, a switchable load, a controller, and a voltage sensor. When the present invention in the first embodiment detects a higher voltage, thus indicating the lamp has been switched from the "off" state to the on state, the switchable load is disconnected, and the current is re-routed to pass through the energy efficient lamp.

20 Claims, 11 Drawing Sheets

Related U.S. Application Data

(60) Provisional application No. 61/562,425, filed on Nov. 21, 2011.

HIGH EFFICIENCY LIGHT COMPATIBILITY DEVICE

REFERENCE TO RELATED APPLICATIONS

This patent application is a Continuation of application Ser. No. 15/646,000, filed Jul. 10, 2017, which is a Continuation-in-Part (CIP) of patent application Ser. No. 15/080,558, filed on Mar. 24, 2016, now issued as U.S. Pat. No. 9,706,625, which is a Continuation-in-Part (CIP) of patent application having application Ser. No. 13/683,665, filed on Nov. 21, 2012, now issued as U.S. Pat. No. 9,301,368, which claims the benefit of provisional application having application No. 61/562,425, which was filed on Nov. 21, 2011. All of the patent applications and issued patents referenced immediately above in this paragraph are hereby incorporated by reference.

BACKGROUND OF THE INVENTION

Field of the Invention

The present invention relates generally to lighting circuitry, and more particularly, to lighting circuitry for stabilizing operation of a high efficiency lighting element activated by an automated switching apparatus, such as a light switch motion detector.

Description of Related Art

Higher efficiency lighting elements, such as Cold Cathode Fluorescent Lamps (CCFL), are becoming extremely popular due to the current "Green" movement. Current government mandates are requiring incandescent bulbs to be phased out of production in favor high efficiency fluorescent light bulbs, such as CCFLs and Light Emitting Diodes (LEDs). Within the next few years incandescent light bulbs are not expected to be available in the marketplace of the United States.

While fluorescent light bulbs provide higher power efficiency and longer life expectancy, fluorescent light bulbs had several negative factors. For instance, it has been discovered that fluorescent light bulbs do not function properly when connected to commonly powered electronic switching devices such as motion detectors, electronic timers, and other devices requiring a low current to pass through the lighting element to provide power to the electronic switching device while the lighting element is in the "off" state. This is typically required due to the wiring limitations of residential homes and other building structures, wherein a small current is required to pass through the lighting element in order to provide current to the electronic switching device.

While the phenomena of current leakage in the off state has existed for quite some time, it has not typically been a problem with incandescent light bulbs. The filament used in incandescent light bulbs allows small currents to pass through the incandescent light bulbs without lighting the bulb because the small current does not experience enough resistance to cause the filament to heat up and glow or light.

High efficiency light bulbs such as Compact Fluorescent (CFL), halogen and Light Emitting Diodes (LEDs) require very little current to operate. When these types of bulbs are installed into a circuit with some form of load control switch such as a motion detect switch (Passive Infrared Sensor, PIR), Timer, Dimmer switch, or any parasitic load control device, the high efficiency bulb, depending on the type, will either flash on and off (flicker) or glow dimly when the switch is in an off state. The reason for this condition with the various bulbs is due to the parasitic load control device when in an "off" state has some minimal level of leakage current which it adversely effects the high efficiency bulbs and the bulbs attempt to turn on. Quiescent current is required to power the parasitic load device in a shutdown condition which allows the parasitic load control device (automatic control switch) to operate.

Accordingly, there exists a need to provide a convenient and easily installed apparatus by consumers that can eliminate the flicker and glow from high efficiency lighting elements using commonly power electronic switching devices.

ASPECT AND SUMMARY OF THE PRESENT INVENTION

In order to achieve these goals, an aspect of the present invention is to provide an inexpensive and energy efficient apparatus that can be easily installed by consumers between a light socket and an energy efficiency lighting element for light sockets controlled by commonly powered electronic switching devices to prevent flickering and glowing of the energy efficient lighting element during the "off" state.

In order to achieve this aspect, for parasitic load control devices using high efficiency bulbs, the required quiescent current must be prevented from reaching the high efficiency bulb. The present invention achieves this aspect by providing an anti-flicker and anti-glow apparatus to be installed in the light socket of a commonly powered electronic switching device, such as a motion activated light switch. An energy efficient light bulb or lamp, such as a CCFL, a Cathode Fluorescent Lamp (CFL), or an LED is then screwed into the apparatus. The present invention does not require any additional wiring or installation procedures. The present invention is electrically connected to the source light socket, and the energy efficient lamp is screwed into the socket within the present invention.

A first embodiment of the present invention includes a switchable light source, a switchable load, a controller, and a voltage sensor. A second embodiment of the present invention includes a switchable load, a controller, a local power supply, and a voltage sensor. Both embodiments of the present invention are designed to provide a minimal load for the minor current to pass through in the "off" state. When the present invention in the first embodiment detects a higher current passing through the minimal load, and therefore a higher voltage, thus indicating the lamp has been switched from the "off" state to the "on" state, the switchable load is disconnected, and the current is re-routed to pass through the energy efficient lamp. Thus, no power is wasted passing current through the switchable load in the "on" state. In the second embodiment, when the present invention detects a higher current passing through the minimal load, and therefore a higher voltage, thus indicating the lamp has been switched from the "off" state to the on state, current through the switchable load is turned off, and the power current is directed to pass through the energy efficient lamp. In the second embodiment, the load resistor is used to hold the voltage low across the hot and neutral (or ground) line, thus keeping the CCFL from firing.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

DETAILED DESCRIPTION OF THE PREFERRED EMBODIMENTS

Figure 1:
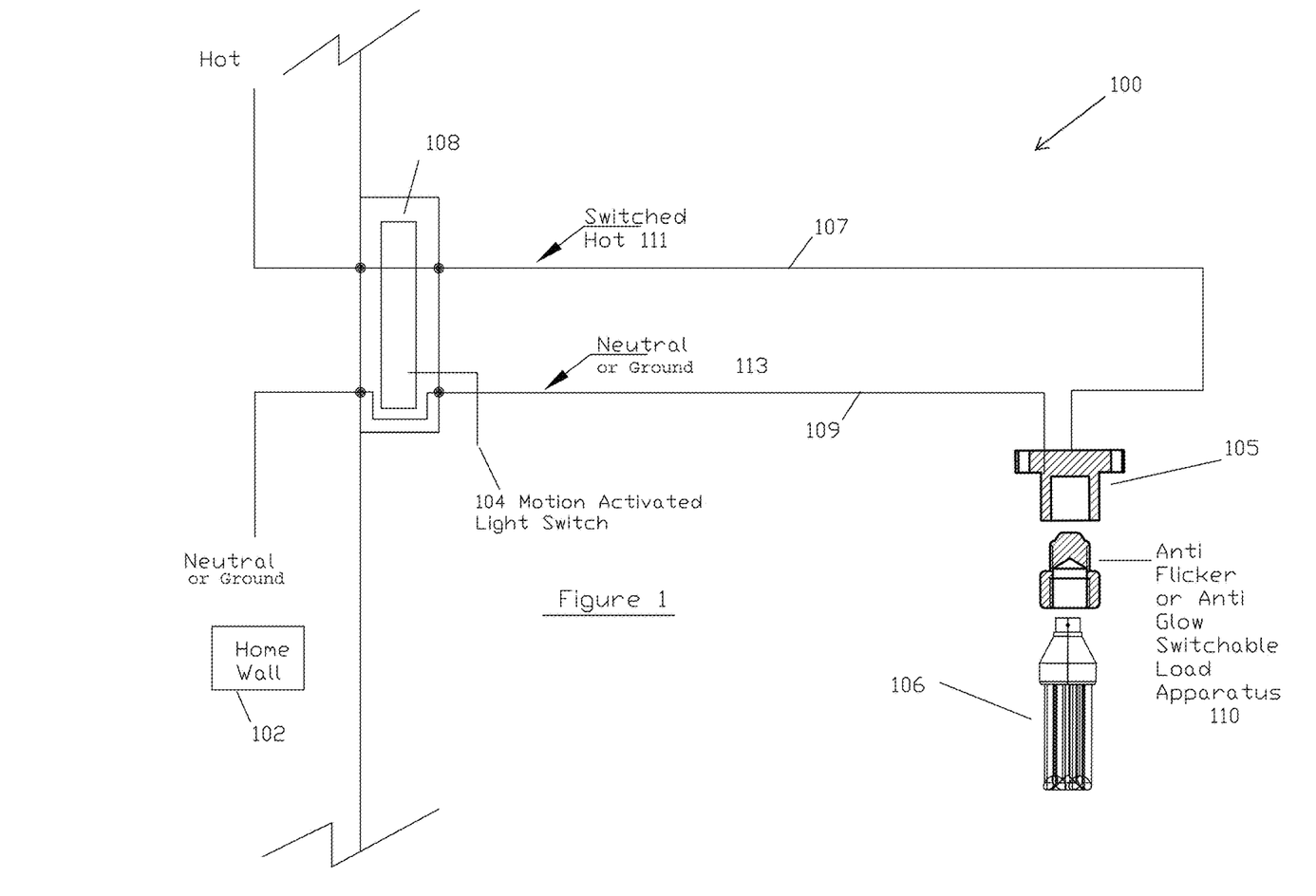
FIG. 1 is a circuit diagram showing the insertion of an anti-flicker apparatus configured in accordance with the present invention into a conventional residential light socket wiring diagram.

Referring now to the drawings, FIG. 1 illustrates a circuit diagram 100 of a conventional light socket wiring diagram of a residential home and internal wall 102, wherein a wall mounted, motion activated light switch 104 controlling an energy efficient light 106 is connected to a light socket 105 having a standard switched hot wire 107 and a standard neutral (or ground) wire 109. As the diagram illustrates, a complete circuit must be established between hot node 111 and neutral (or ground) node 113 of the light switch socket 108 in order to power the auto switch, here a motion detector 104, while the energy efficient lamp 106 is in the "off" state. While this conventionally is accomplished by passing a small current through the lamp 106 to complete the circuit and power the motion detector 104, this results in flickering or a soft glow in energy efficient lamps, as discussed above in the background of the invention section.

In order to overcome this deficiency in the prior art, the present invention provides an anti-flicker or anti-glow switchable load apparatus 110 to carry the current during the "off" state, thus by-passing the energy efficient lamp 106 in the first embodiment of the invention, and minimizing current to the energy efficient lamp in the second embodiment of the present invention, thereby both first and second embodiments of the present invention preventing flickering or glowing of the energy efficient lamp 106. When the motion detector detects movement, and switches from an "off" state to an "on" state, thus providing increased voltage to the socket 105, the anti-flicker switchable load apparatus 110 detects the increased voltage, and re-directs or increases current flow, depending upon the embodiment of the invention, to the lamp 106 instead of a switchable load contained within the anti-flicker switchable load apparatus.

Figure 2:
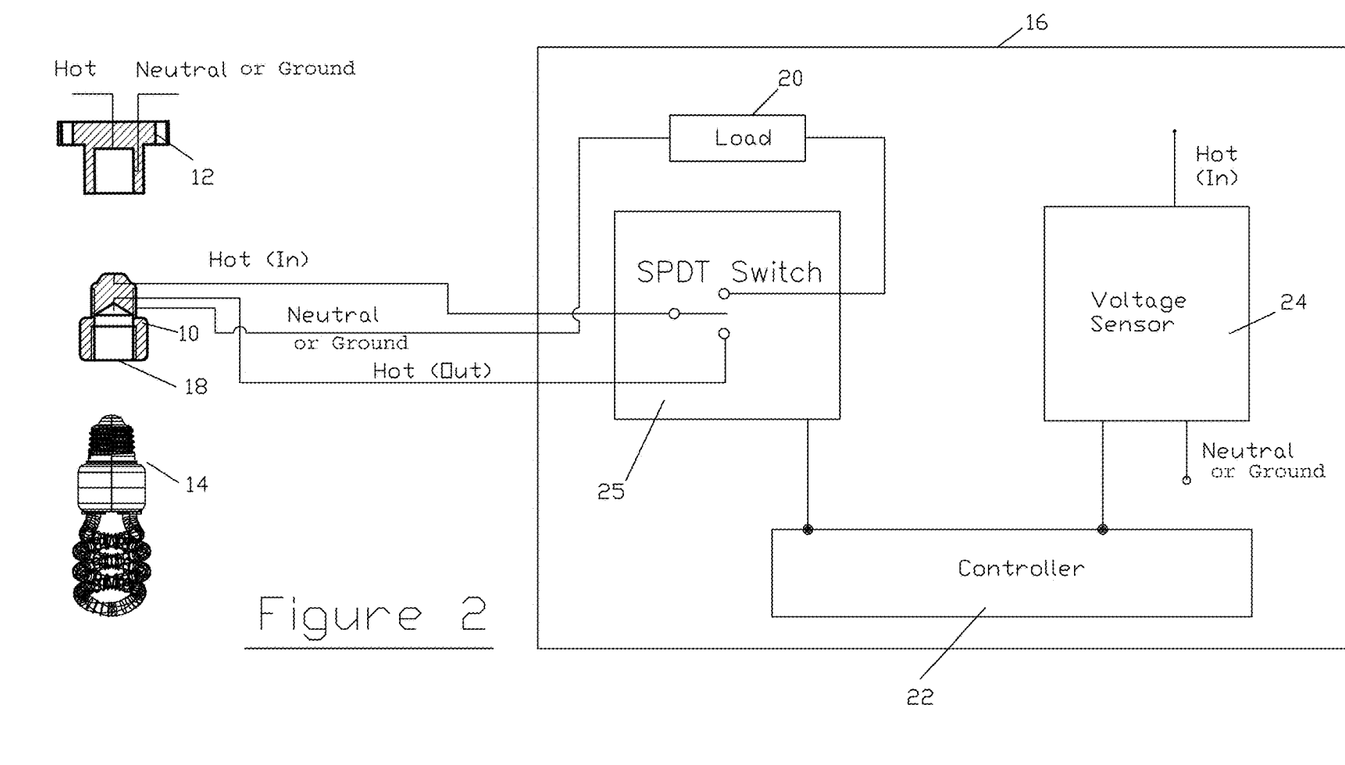
FIG. 2 is a block diagram of an anti-flicker apparatus configured in accordance with a first embodiment of the present invention.

FIG. 2 illustrates a block diagram of anti-flicker or anti-glow apparatus 10 configured in accordance with a first embodiment of the present invention. The apparatus 10 preferably is configured to be easily screwed into the original socket 12 of an electronically activated light source, such as an internal wall-mounted motion activated light switch using an energy efficient lamp 14, such as a CCFL or a CFL. The energy efficient lamp is simply screwed into the light socket 18 of the anti-flicker apparatus 10.

Block diagram 16 illustrates the internal electrical components of the anti-flicker apparatus 10 configured in accordance with a first embodiment of the present invention. Included in the anti-flicker apparatus 10 are a switchable load 20, a controller 22, a voltage sensor 24, and a switchable light source 23. In the illustrated embodiment, the switchable light source 25 is a Single-Pole Double-Through (SPDT) switch. The anti-flicker apparatus 10 is electrically connected between the light socket 12 and the energy efficient lamp 14. During the "off" state, a minimal current passes though the switchable load 20, thus preventing enough current to pass through the energy efficient lamp 14 to cause flicker or a soft glow. The voltage sensor 24 monitors the level of voltage between lines Hot (In) and Neutral (or ground). When the voltage level between lines Hot (In) and Neutral (or ground) increases to a level to indicate the electronic switch, such as a motion sensor, has switched from an "off" state to an "on" state, the controller 22 will disconnect the Hot (In) line from switchable load 20, and connect it to Hot (Out) line, thus re-directing all the current to the lamp 14.

Figure 3:
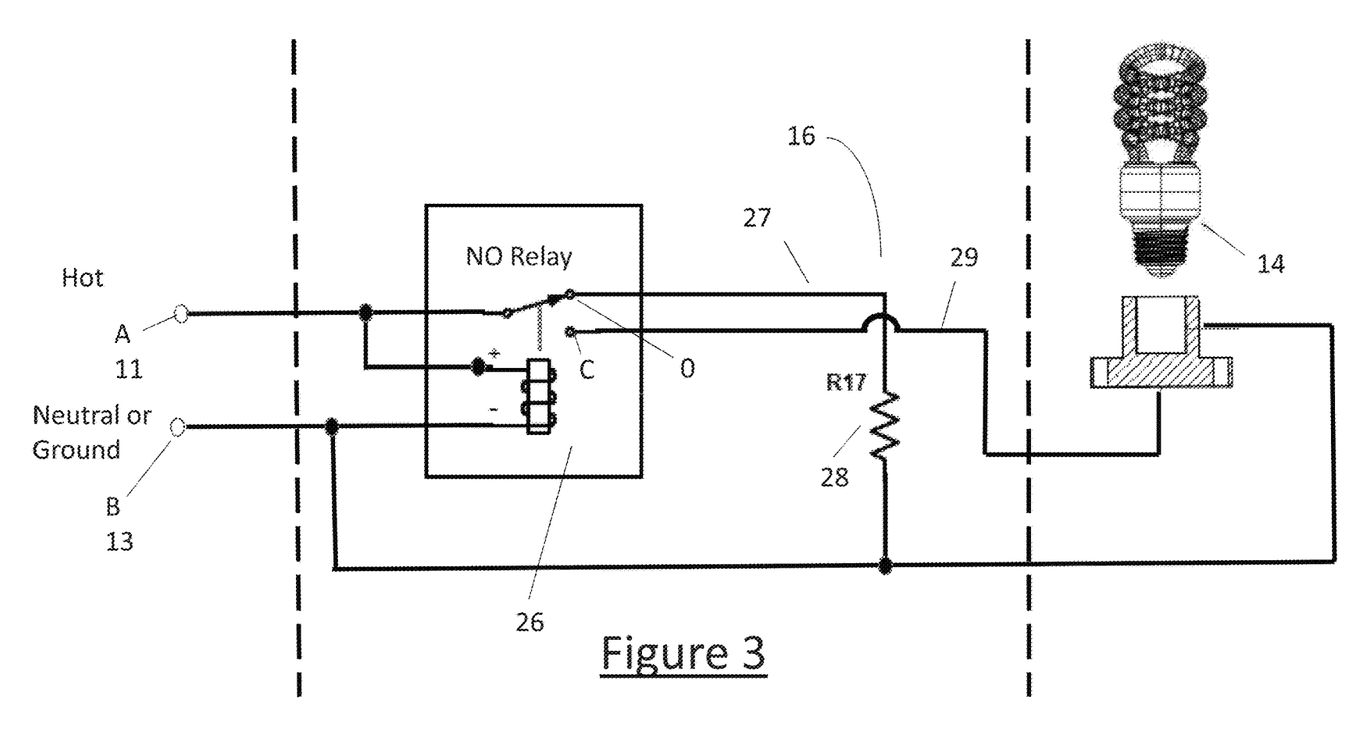
FIG. 3 is a circuit diagram of the block diagram shown in FIG. 2.

FIG. 3 is a circuit diagram corresponding to the block diagram shown in FIG. 2. The energy efficient lamp 14 is shown to be connected to the anti-flicker switchable load apparatus 16. The anti-flicker switchable load apparatus 16 includes a normally open relay 26 and a low-load resistor 28. The normally open relay 26 functions as the controller 22 and the voltage sensor 20. The resistor 28 functions as the switchable load 20. In the "off" state, the normal open relay 26 allows the small current, which provides power to the motion detector, to flow through line 27, which is connected to open position "0" of relay 26. The current passes through low-load resistor 28 to provide a complete circuit back to Neutral (or ground) connection B 13. While the relay 28 is in the normal open position "0", no current flows to the lamp 14 via line 29 because it is an open circuit. While resistor 28 is illustrated as being 17 ohms, resistor 28 can be various low ohms values and still function properly.

When the motion detector detects movement and switches to the "on" state, the voltage level across nodes Hot (A) and Neutral (or ground) (B) increases significantly, which is detected by the normally open "make before brake" relay 26. Sensing the increased voltage, the relay 26 switches to the closed position "C," thus allowing current to flow through line 29 to the lamp 14, and then line 27 changes to an open connection. This design eliminates power loss across the resistor 28 during the "on" state.

Figure 4:
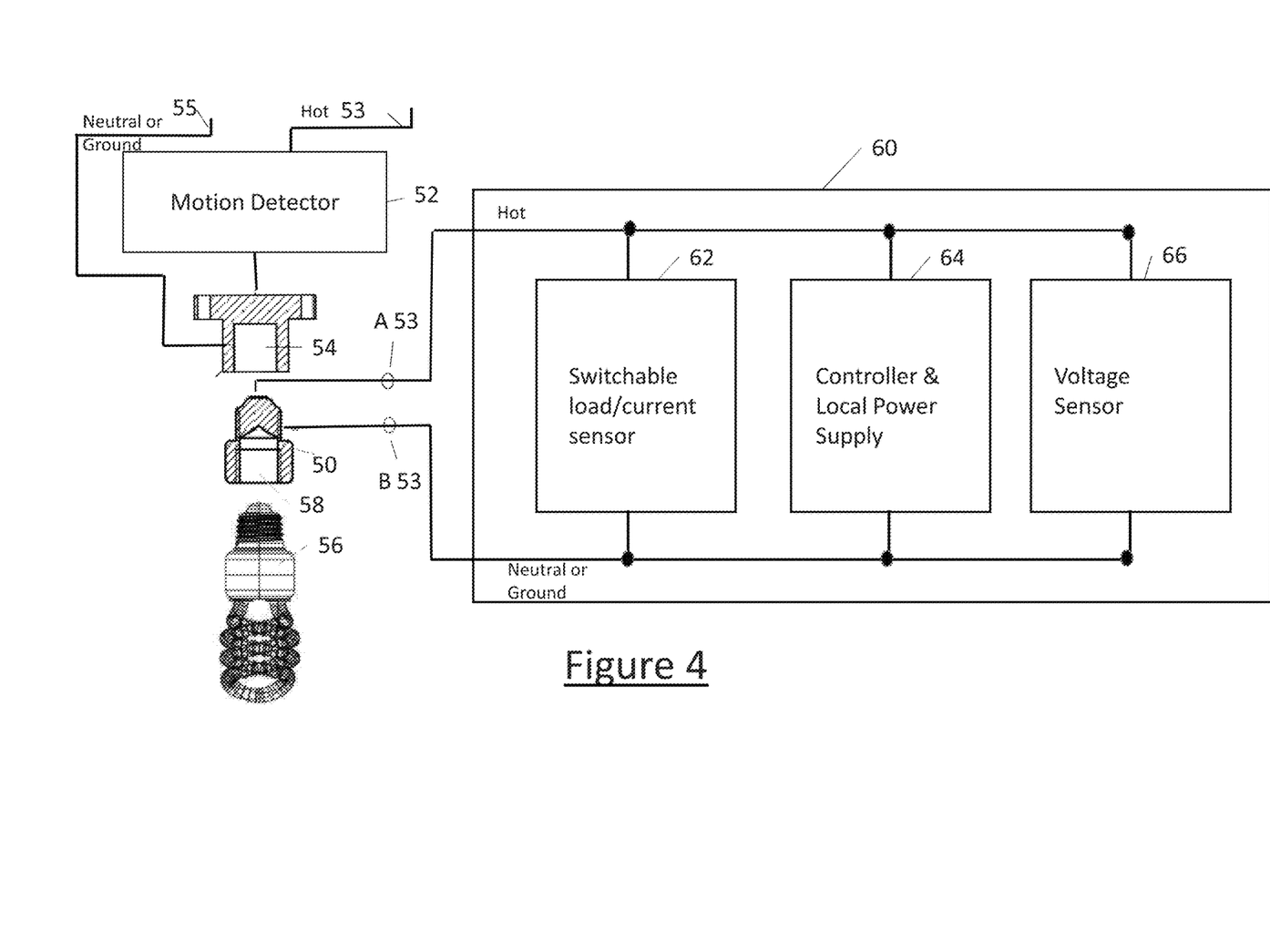
FIG. 4 is a block diagram of an anti-flicker apparatus configured in accordance with a second embodiment of the present invention.

FIG. 4 is a block diagram of an anti-flicker or anti-glow switchable load apparatus 50 configured in accordance with a second embodiment of the present invention. Illustrated is a motion detector 52 including a light socket 54 that is activated by the motion detector. The motion detector security light 52 is designed to be electrically connected and mounted to an electrical switch box for a light fixture having a "hot" wire connection 53 and a "neutral (or ground)" wire connection 55. The components of the anti-flicker switchable load apparatus 50 are illustrated in the block diagram 60 shown in FIG. 4. The anti-flicker switchable load apparatus 50 includes a socket 58 for receiving an energy-efficient lamp 56.

The block diagram 60 of the anti-flicker switchable load apparatus 50 includes a switchable load 62 with an integrated current sensor, a controller and local power supply 64, and a voltage sensor 66. Similar to the first embodiment, the switchable load 62 provides a path for the small current providing power to the motion detector during the "off" state. The voltage sensor 66 monitors the voltage level between the hot lead 53 and the neutral (or ground) lead 55. When the voltage level increases, indicating that the motion detector 52 has detected an object and switched from the "off" state to the "on" state, the switchable load/current sensor 62 detects the increase in voltage and signals the controller and local power supply 64. The controller and local power supply 64 then opens the switchable load 62, turning off current flow through the switchable load 62, which prevents wasting power in the suitable load, since the energy efficient lamp 56 is fully "on." When a decrease in voltage is detected by the voltage sensor 66, thus signaling the motion detector 52 has switched back to an "off" state, the controller and local power supply 64 detects the voltage drop from the voltage sensor 66 and closes the switchable load 62 to re-direct current through the switchable load. This reduces the voltage to the CCFL, thus keeping it from falsely firing.

Figure 5:
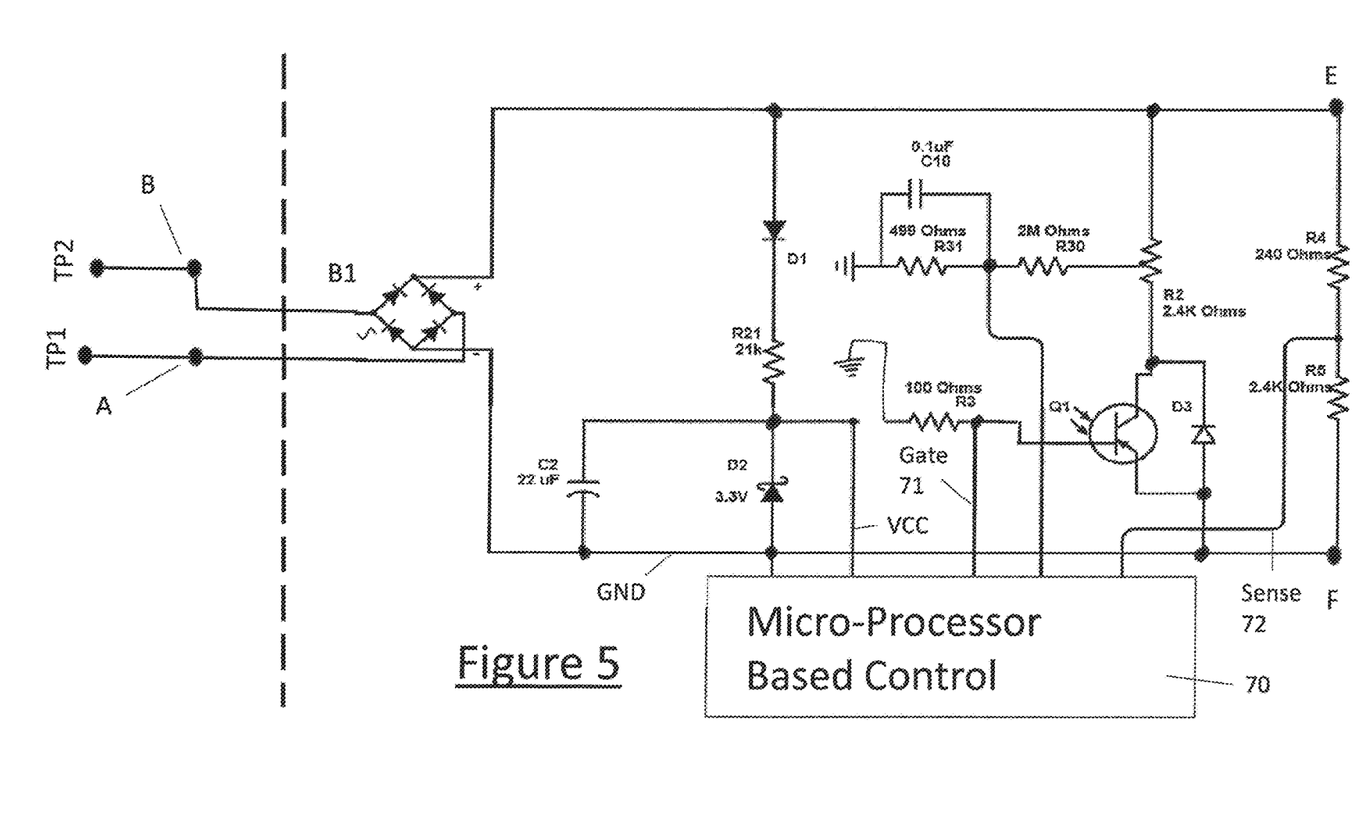
FIG. 5 is a circuit diagram of the block diagram shown in FIG. 4.

FIG. 5 is a circuit diagram of the block diagram 60 shown in FIG. 4. Resistors R4 and R5 function as the voltage sensor 66, and the microprocessor-based control functions as the controller 64. One suitable microprocessor that may be utilized in the illustrated circuit is a Texas Instrument microprocessor, part number MSP 430 G2230. Resistors R2, RA and mosfet Q1 function as a switchable load resistor. R2A senses the current flowing through Q1 when Q1 is activated. This voltage in then divided down through resistor R30 and R31 and filtered with capacitor C10 to provide a current sense of the load to the microprocessor. When the load is not activated, the controller clamps the current sensor input to ground in order to prevent over voltage damage to the controller 70.

The diode bridge B1 converts 120 volts RMS to full wave 180 VDC. The resistor R1, diode D1, capacitor C2, and zener diode D2 create a 3.3v power supply to power the microprocessor 70. The microprocessor 70 monitors the voltage across nodes E and F via sense line 72, which is located between the resistor bridge R4 and R5. The microprocessor also monitors the current by measuring the voltage across R2A to determine the current through the load when Q1 is active. The microprocessor 70 is programmed to control the switchable load 62 to provide power for the motion detector 52 in the "off" state. When the controller has switched off the load and the motion detector is on, the controller monitors the voltage across nodes E and F via sense line 71, which is located between the resistor bridge R4 and R5. The microprocessor 70 is programmed to control the switchable load to turn back on when the voltage is too low.

The switchable load 62 includes the mosfet Q1 and the resistive load bank R2. The mosfet Q1 has a shunt resistor R3 on the gate to ensure the mosfet Q1 is off during power up. The microprocessor 70 activates the mosfet Q1 when current flow is necessary to provide power to the motion detector 52 and shuts off when the motion detector 52 has turned on the light 56 so it does not waste power and overheat the resistive load bank. The microprocessor 70 also utilizes the current sensor to determine when the motion detector has turned on and current is larger than when it is in a quiescent state. This is accomplished though the gate control line 71 in FIG. 1. This embodiment of the microprocessor 70 was selected because of its price and ability to implement an intelligent switching load.

Figure 6:
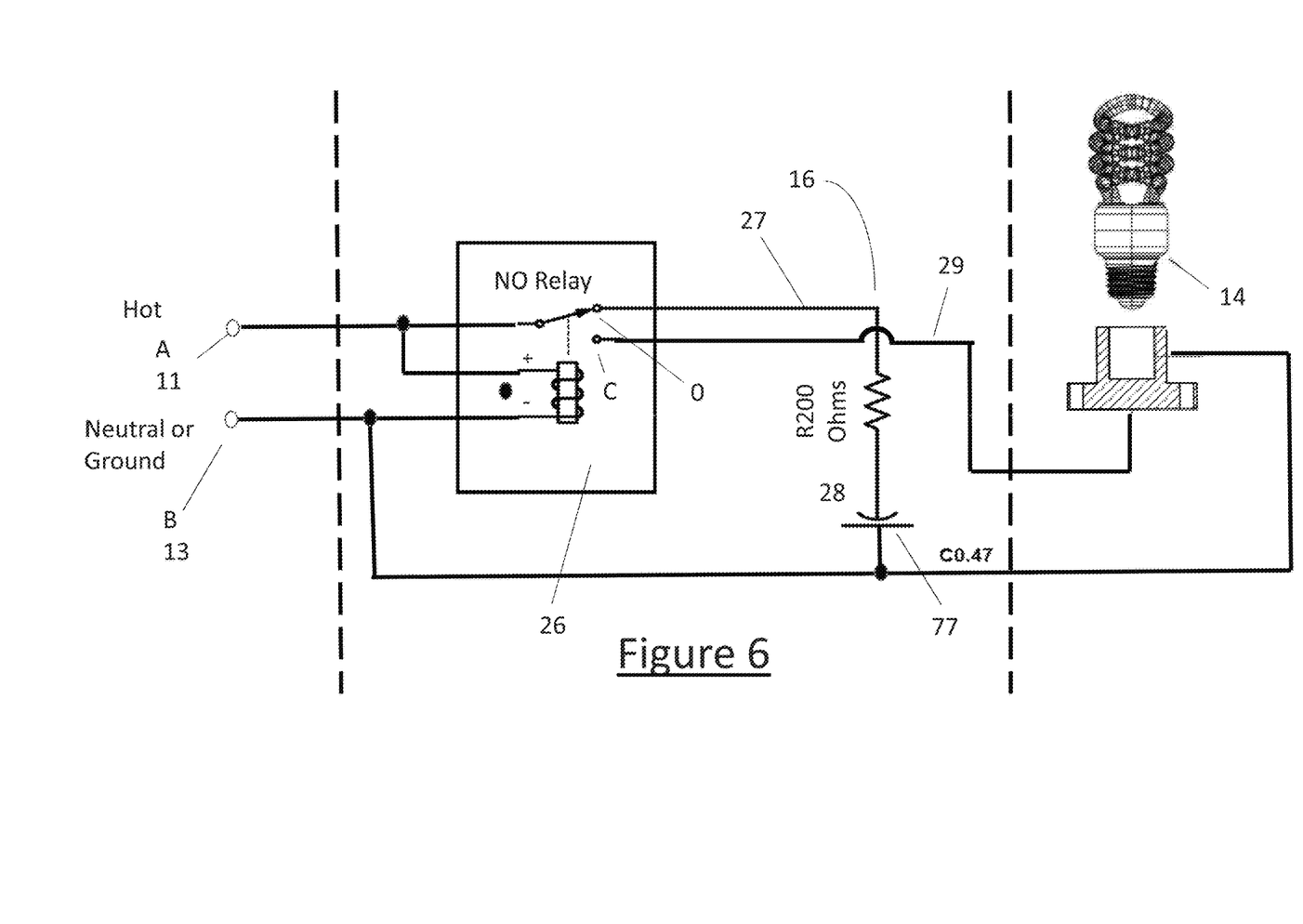
FIG. 6 is a circuit diagram similar to the circuit shown in FIG. 3, except a capacitor 77 has been added.

FIG. 6 is a circuit diagram similar to the circuit shown in FIG. 3, except a capacitor has been added.

Figure 7:
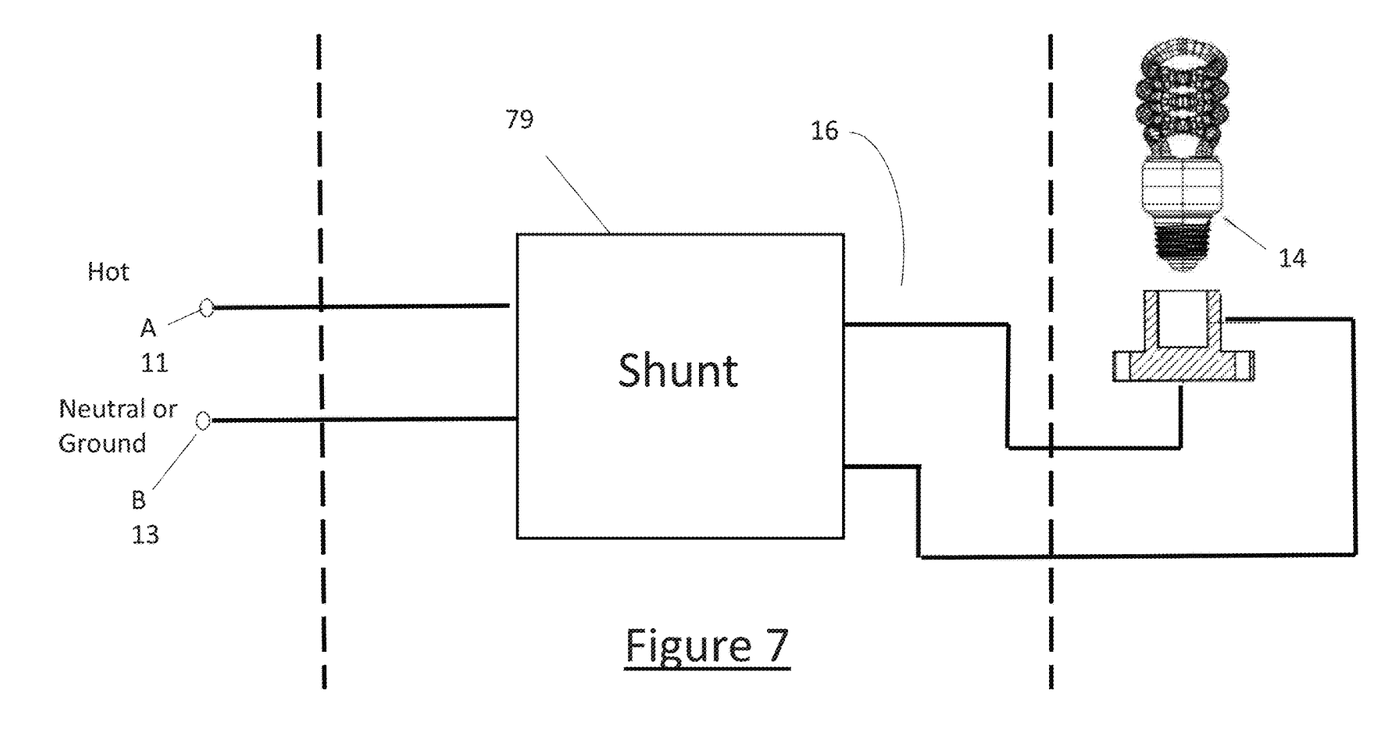
FIG. 7 is a circuit diagram similar to circuit shown in FIG. 3, except the normally open relay 26 and a low-load resistor 28 have been replaced by a shunting circuit.

FIG. 7. is a circuit diagram similar to circuit shown in FIG. 3, except the normally open relay 26 and a low-load resistor 28 have been replaced by a shunting circuit.

Various types of parasitic load control devices were examined by the inventors of the present invention which were not compatible with high efficiency bulbs, in particular, a series of motion detect switches were reviewed in detail. When the device is in motion detector mode and the lamp is supposed to be off, the flickering occurs. It appears the switch is designed so that when the device is in motion detector mode the Resistor Capacitor (RC) network is not in parallel with the load. This explains why the flickering occurs when the lamp is supposed to be off. In the motion sensing mode the device is not compatible, presumably since the RC network is switched out allowing the quiescent current to reach the high efficiency bulb.

The inventors of the present invention determined that a method of preventing the quiescent current from reaching the high efficiency bulb is to shunt the current, diverting it to another path within the circuit or lowering the current below the threshold of causing the various types of high efficiency bulbs to false start.

Shunting methods can range from simple to complex designs to accomplish this task. The most common ways to sense current are a resistive shunt, the current transformer and the Hall Effect current sensor.

Figure 8:
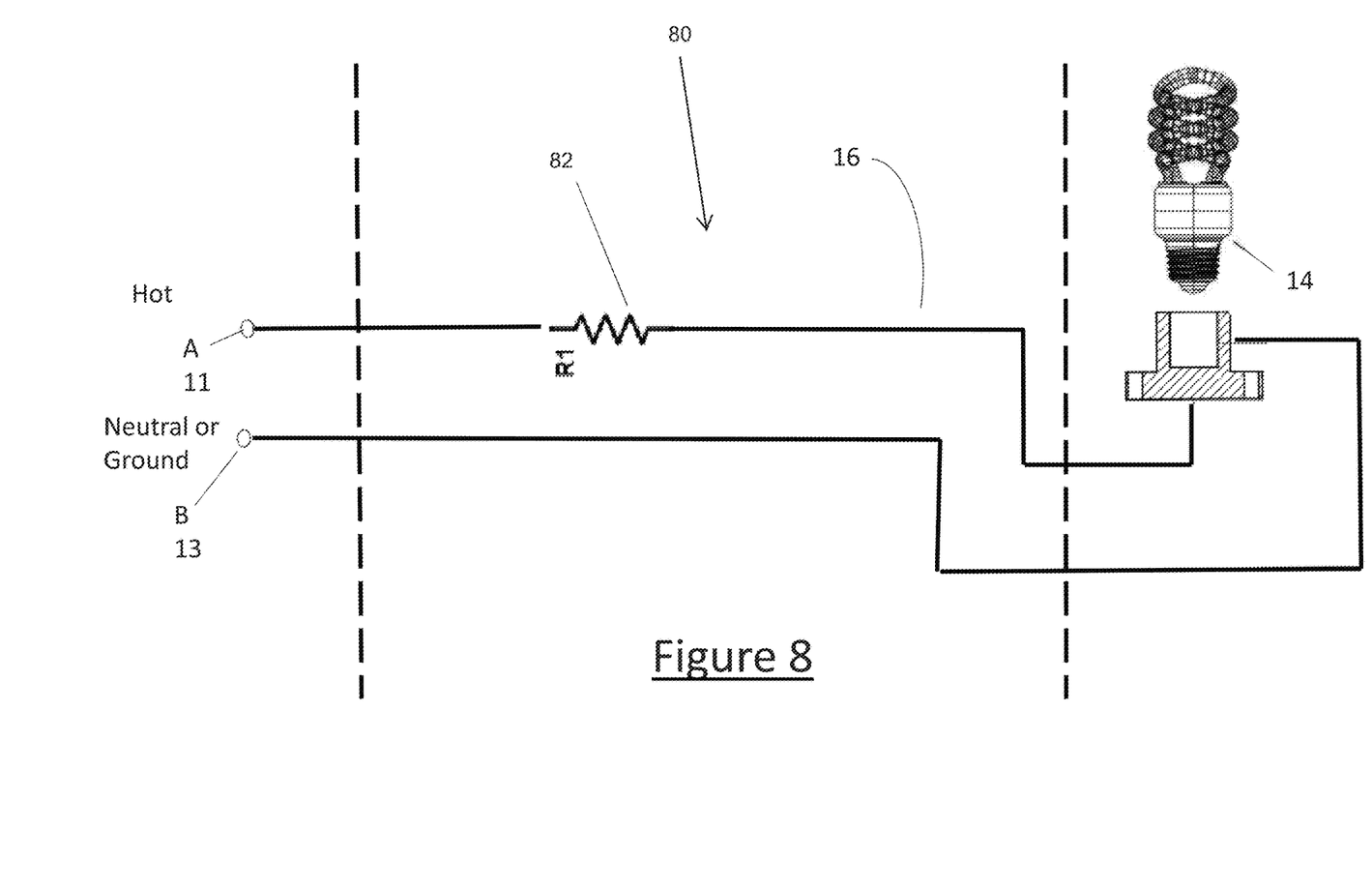
FIG. 8 illustrates a resistive shunt circuit configures in accordance with the present invention.

FIG. 8 illustrates a resistive shunt circuit 80 comprised of a resistor 82 installed in series with the load, such as an energy efficient lamp 14. The series resistor 82 is sized appropriately to prevent quiescent current from reaching the high efficiency bulb and rated for the appropriate full load current when the parasitic load control device is in the "on" state. A resistive shunt circuit 80 installed in parallel to the load will provide a path to neutral for the quiescent current when the parasitic load device is in the "off" state and when the parasitic load device is in the "on" state, the current will be high enough to power the load with limited current flow through the resistive shunt.

Figure 9:
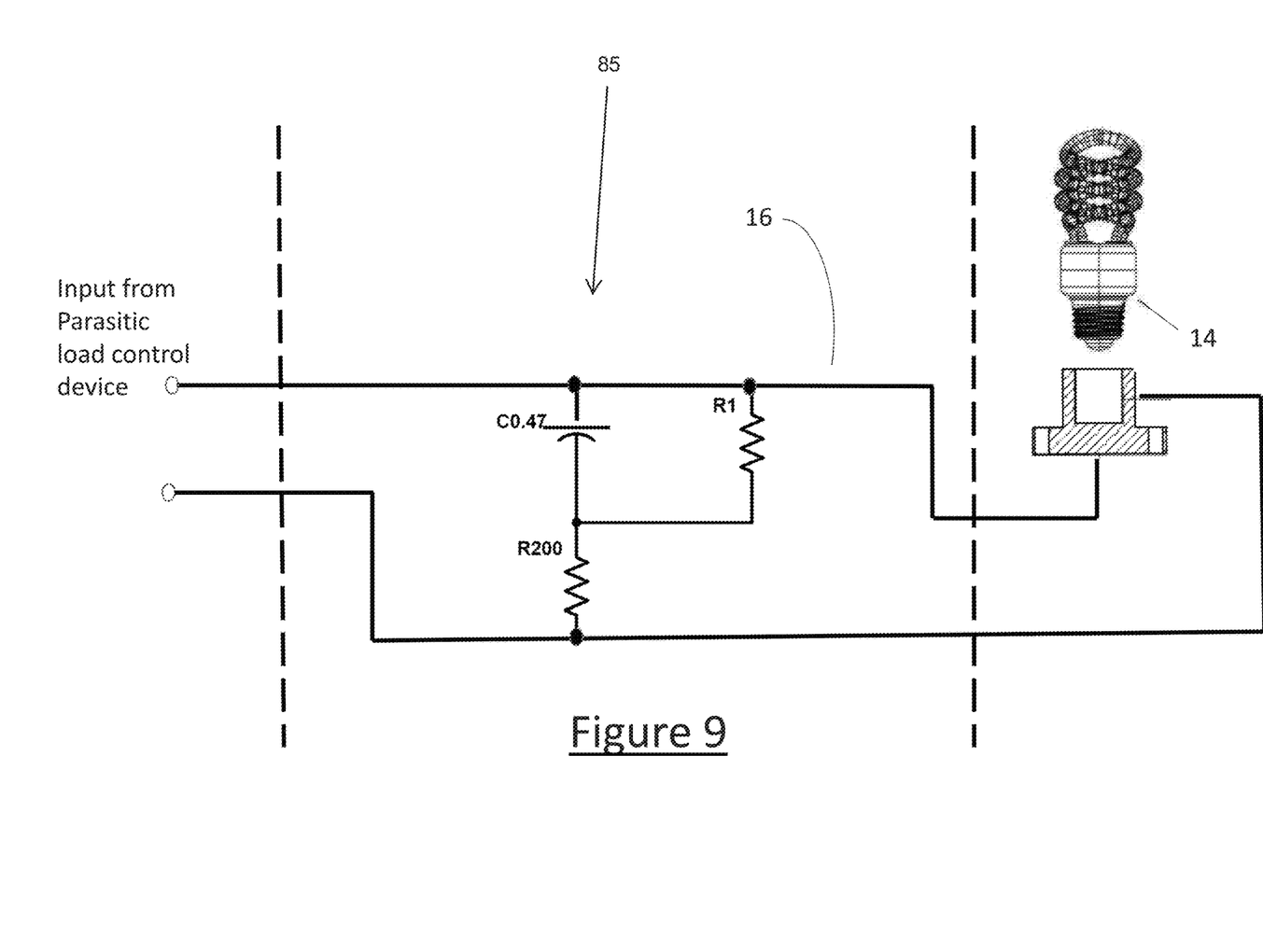
FIG. 9 illustrates a resistive capacitance shunt circuit configured in accordance with the present invention.

FIG. 9 illustrates a resistive capacitive shunt circuit 85 for preventing quiescent current from reaching the load 14. The resistive capacitive shunt 85 can be inserted all the time, and it would not need to be switched out of the circuit. If a series resistor is added it would add some power dissipation but this could be kept low. The RC network shown in FIG. 9 addresses the issue with CCFL and LED based lamps.

As shown in FIG. 9, a parasitic load control device is illustrated on the left hand side, and a load 14 is shown on the right hand side, such as an incandescent lamp, CFL Lamp, LED Lamp, or some combination. The illustrated RC network is a series parallel combination that is in parallel with the load.

Figure 10:
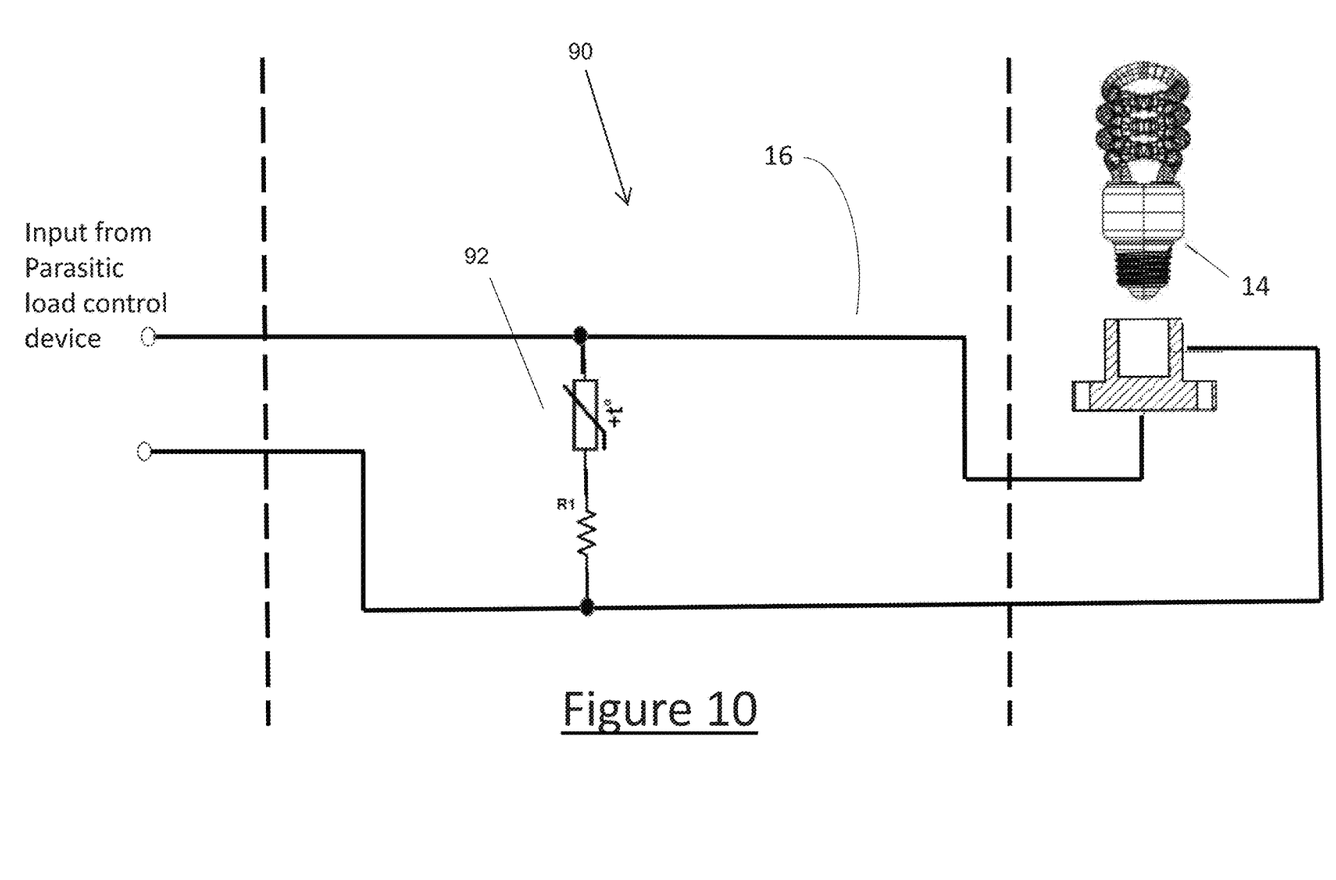
FIG. 10 illustrates a shunt circuit utilizing a positive temperature coefficient device configured in accordance with the present invention.

FIG. 10 illustrates a positive temperature coefficient device circuit 90. When current is applied that is above the rated trip current level, the temperature rise within the positive temperature coefficient device 92 causes the internal resistance to rise very quickly resulting in the device protecting itself as well as the protected circuitry. The added circuitry is in parallel with the load 14. The added circuitry where the PTCC is used is a series string.

Figure 11:
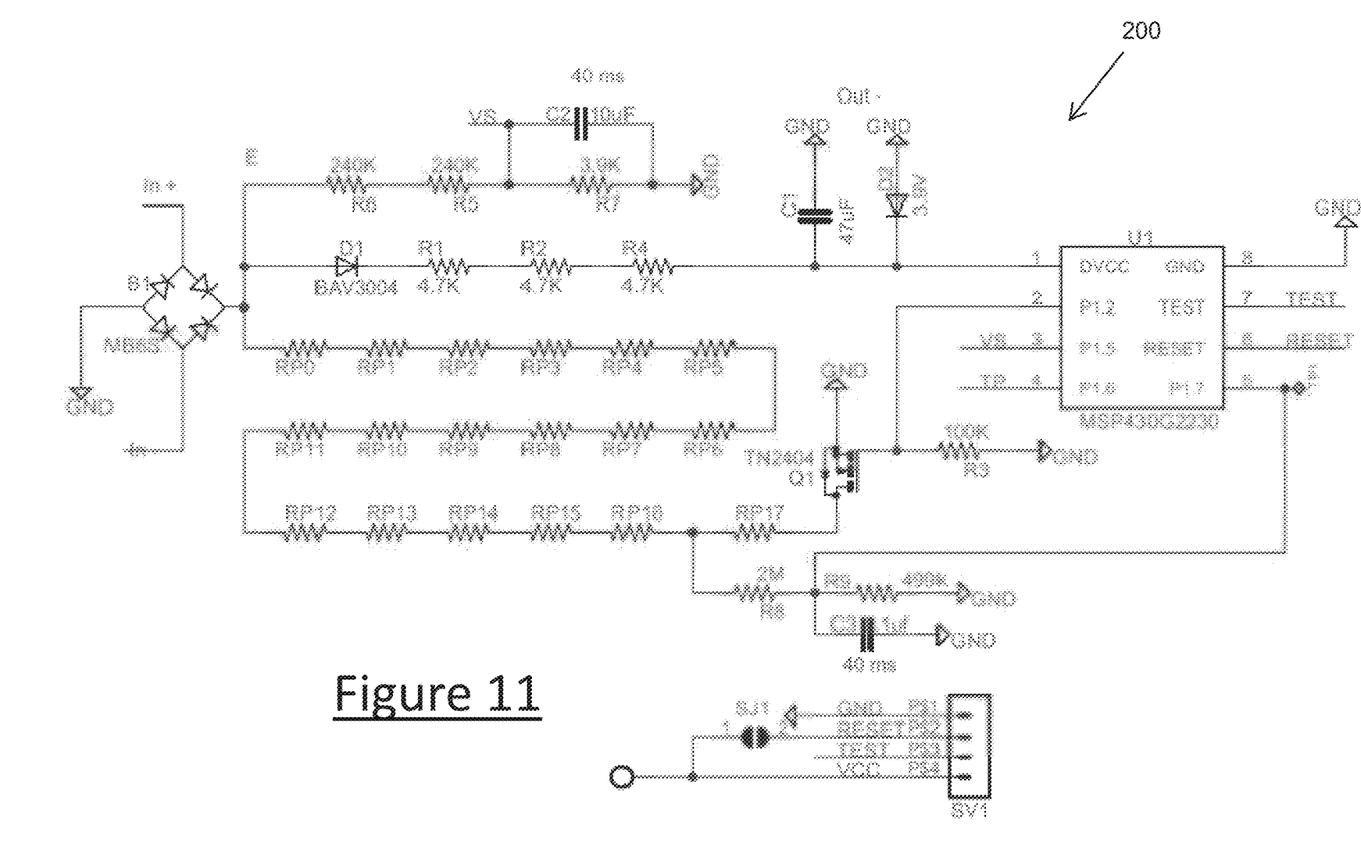
FIG. 11 illustrates a circuit diagram of a further embodiment of an anti-flicker controller configured in accordance with the present invention.

FIG. 11 is a circuit diagram of a further embodiment of an anti-flicker controller or high efficiency light compatibility device 200 configured in accordance with the present invention. Power is applied on leads "in+" and "in–" that connect B1. The diode Bridge B1 converts 120 volts RMS to full wave 180 VDC. The resistors R1, R2, R4, DIODE D1, capacitor C1 and the zener diode D2 create a 3.3 volt power supply to power the microprocessor U1. Resistors R6, R5, R7 and Capacitor C2 function as a voltage sensor that is read by the microprocessor U1 on pin 3. When Q1 is activated, components RP17, R8, R9 and C3 act as a current monitor. When the load is not activated, the controller clamps the current sensing input to ground to prevent over voltage damage to the controller. Resistors RP0 thru RP17 act as a load when switched on by Q1, which is controlled by U1 threw pin 2. Resistor R3 is used to keep the load disabled until the microprocessor U1 is out of reset and stabilized. One suitable microprocessor that may be utilized is the illustrated Texas Instrument microprocessor, part number msp430G2230. Connector SV1 and associated connection are used to program the microprocessor U1 and are not relevant once U1 is programmed.

The microprocessor U1 monitors the current to determine the load when Q1 is active. The microprocessor U1 is programmed to control the switchable load to provide power for the external device when it is in the "off" state. When the external device has turned on, the controller 200 detects the increase in current and switches off the load. When the controller 200 has switched off the load and the motion detector is on, the controller 200 monitors the voltage detector to determine if the external device has turned off the power. When this happens the controller 200 re-asserts the load to provide power to the external device.

It should also be understood that the present invention is not limited to the specifically illustrated package designs. For example, the present invention also can be located within light socket fixture box, typically located within the ceiling of a home. Further, the present invention can be incorporated into various types of electronics switches, in addition to electronic switches such as motion detectors and electronic timers.

The invention claimed is:

1. An apparatus for stabilizing an energy-efficient light connected to a motion detector by redirecting current away from the energy-efficient light during an off-state, comprising:
   an electrical switch configured for directing current to a first electrical contact during an on-state and a second electrical contact during an off-state;
   an energy-efficient light electrically connected between the first electrical contact of the electrical switch and a common electrical node;
   an electrical resistive load electrically connected between the second electrical contact of the electrical switch and the common electrical node;
   a controller electrically connected to the electrical switch, wherein the controller directs the electrical switch to pass electrical current to the first electrical contact in response to a received on-state signal and the second electrical contact in response to a received off-state signal; and
   a motion detector connected electrically to the controller, wherein the motion detector sends an on-state signal to the controller in response to detected motion and sends an off-state signal to the controller in response to a lack of detected motion.

2. The apparatus of claim 1, further comprising:
   a housing having a threaded base that is configured to be screwed into a standard light bulb socket.

3. The apparatus of claim 1, wherein the controller includes a microprocessor.

4. The apparatus of claim 1, wherein the energy-efficient light is a CFL.

5. The apparatus of claim 1, wherein the energy-efficient light is an LED.

6. An apparatus for stabilizing an energy-efficient light connected to an external electrical switch by redirecting current away from the energy-efficient light during an off-state, comprising:
   an internal electrical switch configured for directing current to a first electrical contact during an on-state and a second electrical contact during an off-state;
   a receptacle for receiving an energy-efficient light, wherein the receptacle is electrically connected between the first electrical contact of the internal electrical switch and a common electrical node;
   an electrical resistive load electrically connected between the second electrical contact of the internal electrical switch and the common electrical node; and
   a controller electrically connected to an external electrical switch, wherein the controller directs the internal electrical switch to pass electrical current to the first electrical contact in response to a received on-state signal from the external electrical switch and the second electrical contact in response to a received off-state signal from the external electrical switch.

7. The apparatus of claim 6, wherein the external electrical switch is included within a motion detector connected electrically to the controller, and the motion detector sends an on-state signal to the controller in response to detected motion and sends an off-state signal to the controller in response to a lack of detected motion.

8. The apparatus of claim 6, wherein the receptacle includes an electrical socket.

9. The apparatus of claim 6, wherein the controller includes a microprocessor.

10. The apparatus of claim 6, further comprising:
    an energy-efficient light electrically connected to the receptacle.

11. The apparatus of claim 10, wherein the energy-efficient light is a CFL.

12. The apparatus of claim 6, wherein the receptacle includes exposed electrical contacts to be electrically connected to an energy-efficient light.

13. The apparatus of claim 6, further comprising an external electrical switch to signal the on-state and the off-state.

14. The apparatus of claim 13, wherein the external electrical switch includes an electronic timer to signal the on-state and the off-state.

15. The apparatus of claim 13, wherein the external electrical switch includes a wall mounted electronic timer to signal the on-state and the off-state.

16. The apparatus of claim 13, wherein the external electrical switch includes a dimmer switch.

17. The apparatus of claim 13, wherein the external electrical switch includes a photoelectric switch.

18. The apparatus of claim 13, wherein the external electrical switch is passive.

19. The apparatus of claim 13, wherein the external electrical switch is non-passive, thereby requiring an external power source for the external electrical switch to function properly.

20. The apparatus of claim 13, wherein the external electrical switch is a passive mechanical switch, thereby functioning properly without an external power source.

* * * * *